United States Patent
Pollard et al.

(10) Patent No.: US 10,002,413 B2
(45) Date of Patent: Jun. 19, 2018

(54) RECOVERING PLANAR PROJECTIONS

(71) Applicant: Hewlett-Packard Development Company, L.P., Houston, TX (US)

(72) Inventors: Stephen Pollard, Bristol (GB); Robert Ulichney, Stow, MA (US); Matthew D Gaubatz, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/327,977

(22) PCT Filed: Jul. 22, 2014

(86) PCT No.: PCT/US2014/047676
§ 371 (c)(1),
(2) Date: Jan. 20, 2017

(87) PCT Pub. No.: WO2016/014040
PCT Pub. Date: Jan. 28, 2016

(65) Prior Publication Data
US 2017/0213329 A1    Jul. 27, 2017

(51) Int. Cl.
*G06T 5/10* (2006.01)
*G06T 7/73* (2017.01)

(52) U.S. Cl.
CPC .............. *G06T 5/10* (2013.01); *G06T 7/73* (2017.01); *G06T 2207/20056* (2013.01)

(58) Field of Classification Search
CPC ... G06T 2207/20056; G06T 2201/0601; G06T 3/0006; G06T 3/0075; G06T 5/006; G06T 5/10; G06T 7/37; G06T 7/73; G06K 9/6211; H04N 5/74; H04N 1/6047; H04N 1/6055

See application file for complete search history.

(56) References Cited

U.S. PATENT DOCUMENTS

| 6,873,732 B2 | 3/2005 | Dance |
| 8,411,998 B2 | 4/2013 | Huggett et al. |
| 8,532,365 B2 | 9/2013 | Tate |
| 8,687,070 B2 | 4/2014 | Chen et al. |

(Continued)

FOREIGN PATENT DOCUMENTS

| JP | 2005510921 A | 4/2005 |
| JP | 2013117960 A | 6/2013 |

OTHER PUBLICATIONS

Radovan Ridzon et al, "Robust Digital Watermarking Based ont he Log-Polar Mapping", Radio Engineering, V16(4), Dec 2007.

(Continued)

*Primary Examiner* — Edward Park
*Assistant Examiner* — Michael Vanchy, Jr.
(74) *Attorney, Agent, or Firm* — Trenner Law Firm, LLC

(57) ABSTRACT

An example method of recovering a planar projection in a captured image. The example method includes selecting displaced points in the captured image. The example method also includes recovering an affine transform of a quasi-periodic object for each of the displaced points based on peak locations of Discrete Fourier Transform (DFT) of the captured image. The example method also includes combining each of the affine transforms for the displaced points to recover the planar projection and correct for perspective distortion in the captured image.

15 Claims, 9 Drawing Sheets

(56) References Cited

U.S. PATENT DOCUMENTS

2003/0133589 A1\* 7/2003 Deguillaume ....... G06K 9/6211
  382/100
2003/0228030 A1 12/2003 Wendt
2010/0141991 A1 6/2010 Yoshida et al.

OTHER PUBLICATIONS

Tong, L et al, "Correction of Perspective Text Image Based on Gradient Method", Oct. 18-19, 2010.

\* cited by examiner

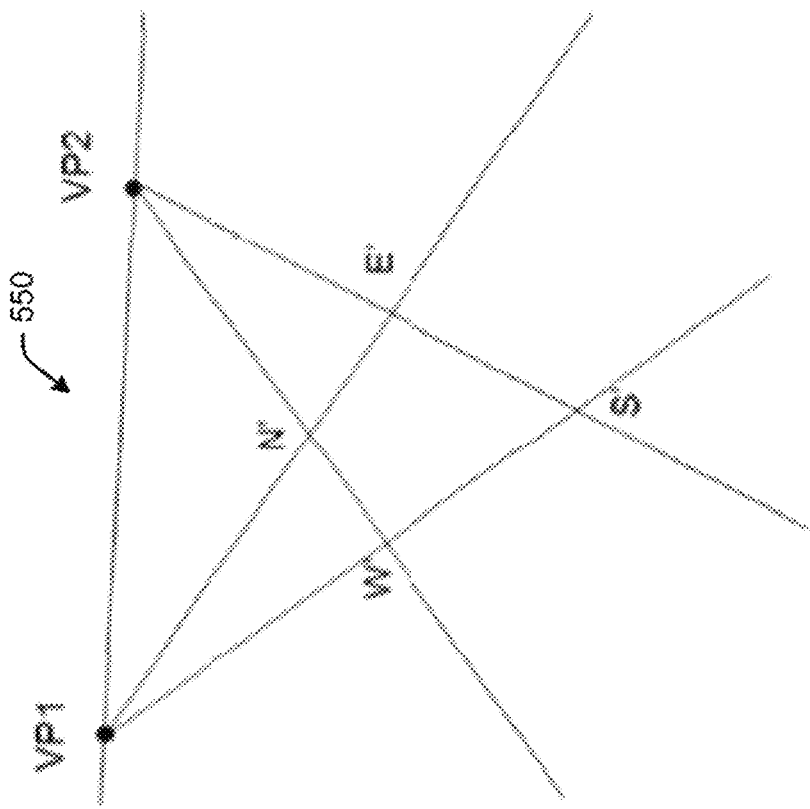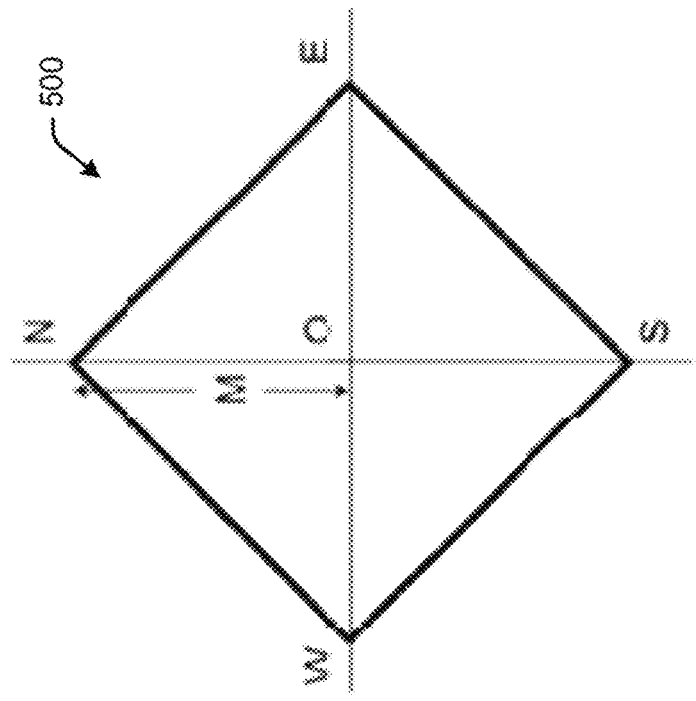

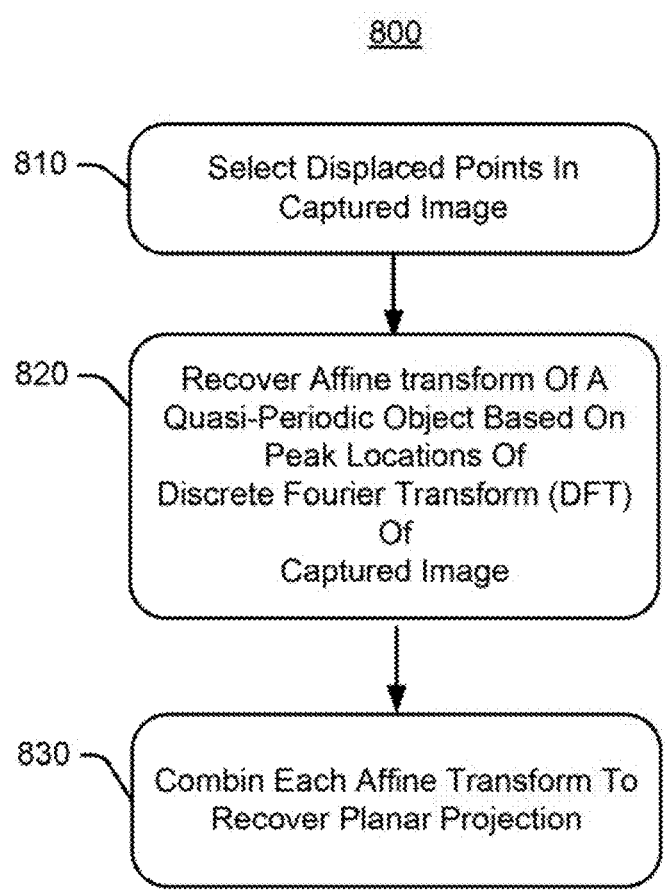

RECOVERING PLANAR PROJECTIONS

BACKGROUND

Imaging modules are no longer limited to desktop scanners or high end cameras. Quality imaging modules are now available in a wide variety of stand-alone and handheld or mobile devices (e.g., a mobile phone with a high resolution camera module). As the quality and resolution of these imaging modules continue to improve, the captured images include more clearly delineated individual dots of printed halftone images or other printed patterns. As such, the imaging modules in mobile devices may be sufficient to recover information represented in the image by modulating the position of individual dots. However, the user often holds the mobile device (and hence the camera module) in a non-frontoplanar orientation relative to the image being captured, which can result in perspective distortion in the captured image. Perspective distortion makes it difficult to recover information in the captured image.

BRIEF DESCRIPTION OF THE DRAWINGS

FIG. 3b is a magnitude plot of an example Fourier transform (shown as an inverted log plot to illustrate weaker higher frequency components) of the halftone screen shown in FIG. 3a.

FIG. 5a-b illustrate (a) example positions of cardinal points, and (b) an example of corresponding positions of the cardinal points in a perspective image.

FIGS. 6a-b show (a) an example of transformed cardinal points and recovered screen directions in a digital halftone image captured with perspective distortion, and (b) an example of vanishing lines for the points shown in FIG. 6a.

FIGS. 7a-b show (a) an example of reconstructed East and West cardinal points using approximate North and South cardinal points and calculated vanishing points, and (b) an example of a dewarped image using a homography calculated from the transformed cardinal points in FIG. 7a.

FIGS. 8 and 9 are flowcharts illustrating example operations which may be implemented to recover planar projections and correct perspective distortion in an image.

DETAILED DESCRIPTION

Figure 1:
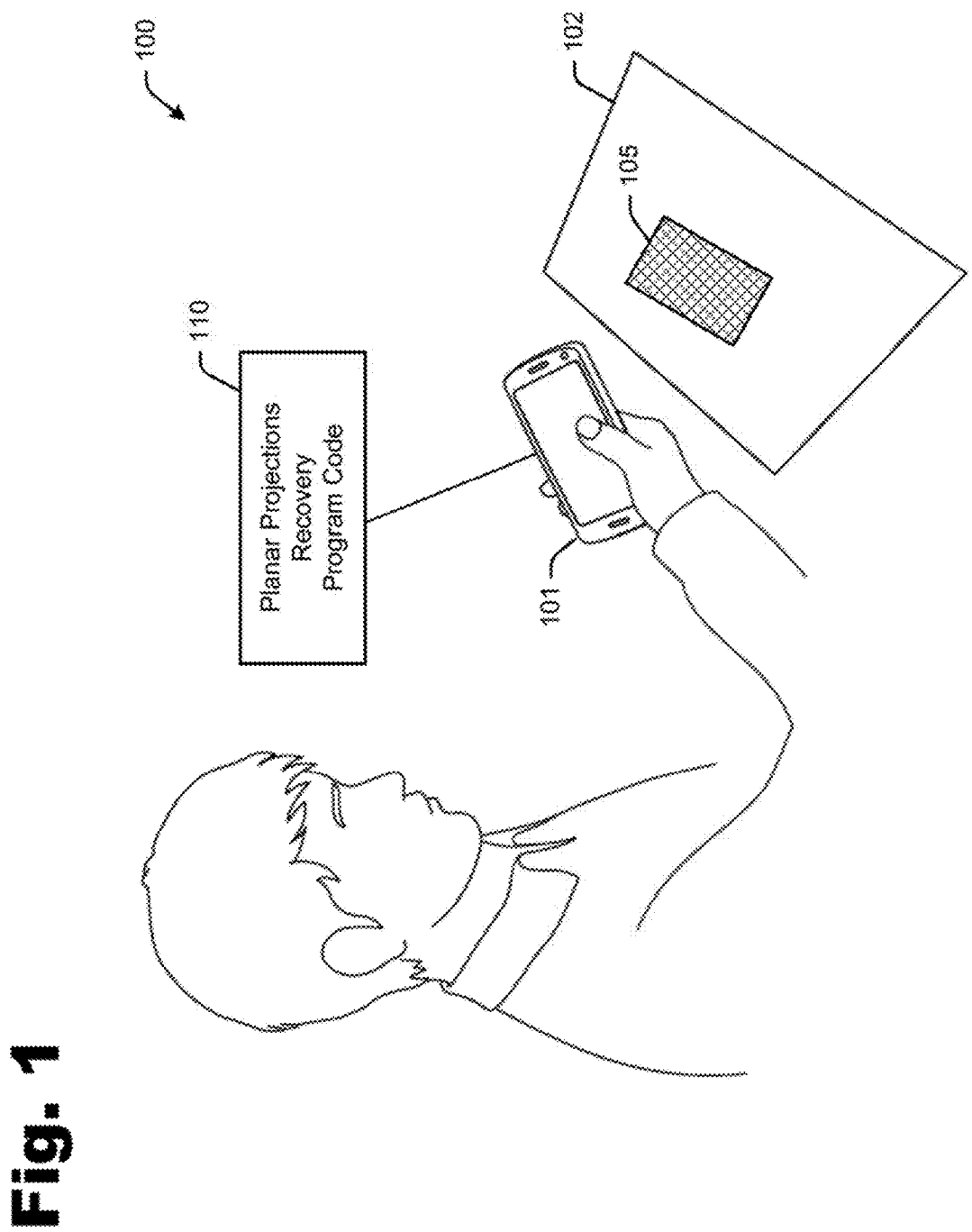
FIG. 1 is a high-level block diagram of an example system which may be implemented to recover planar projections and correct perspective distortion in a captured image.

Before being able to automatically recover information or embedded data from a captured image, an initial processing step is to remove any perspective distortion from the captured image. After removing perspective distortion, embedded data represented in the structure of the image (e.g., Stegatones) can be recovered from the modulation of the position of the individual printed halftone dots.

Perspective distortion in images can be corrected using the system and method disclosed herein of recovering planar projections. The system and method disclosed herein have even broader implications than automatic image registration. That is, the system and method disclosed herein can automatically correct perspective distortion in the image without any prior knowledge of the image design itself.

While it is possible to use computer-generated "knowledge" of the original halftone pattern (or the original image) depicted in an image to estimate planar distortion, in some applications, such prior knowledge of the depicted image is unavailable at the time of the decode capture. For example, some quasi-periodic data bearing marks (such as Stegatones and grid codes) may not have fiducials from which a detector can directly recover the planar projection from a captured image with perspective distortion. An example implementation of the system and method is based on a computer-implemented process of interpreting the structure of the target image itself, without having to compare the target image with a known image.

In an example, a computer-implemented process issued to recover initial affine approximations from the shifted positions of the characteristic peaks in the frequency domain. Further approximation of the non-affine components of the planar projection are then recovered using a computer-implemented process to identify vanishing points and compute a planar projective transform (e.g., a homography). Vanishing points can be computed directly from the structure of the halftone dots, or implied from the variation in the local affine approximation derived in the frequency domain. A final affine correction is then recovered using the computed homography from the reconstructed image, to remove any remaining scale and aspect ratio inaccuracies.

The system and method disclosed herein can be implemented by a computer system to recover a fully rectified image from a captured image using only knowledge of the halftone screen angle and its cell size. If this information is not known, the captured image can still be corrected by the computer-implemented process, e.g., up to an unknown scale and/or aspect ratio. As such, the system and method operate without relying on fiducials or prior knowledge of the captured image.

The system and method disclosed herein can be implemented by a computer-implemented process to directly, robustly, and quickly compute affine approximation(s), thus simplifying recovery of a full transform of the image from a captured image with perspective distortion. The system and method disclosed herein may operate even without calibration points or other markings in the captured image. Indeed, the captured image does not even have to be rectangular. In an example, an entire object does not need to be captured as part of the image before applying the techniques described herein.

Before continuing, it is noted that as used herein, the terms "includes" and "including" mean, but is not limited to, "includes" or "including" and "includes at least" or "including at least." The term "based on" means "based on" and "based at least in part on."

FIG. 1 is a high-level block diagram of an example system which may be implemented to recover planar projections and correct perspective distortion in a captured image. In an example, the system 100 may be associated with a mobile device 101 for capturing a video or still image of a paper 102. The image may include a quasi-periodic, two-dimensional object 105. The quasi-periodic, two-dimensional object 105 may be an embedded data-bearing object, such as a data-bearing halftone structure (e.g., a Stegatone).

Using a hand-held mobile device 101 to capture an image from the paper 102 results in distortion, as illustrated in FIG. 1. Due to the orientation the camera in a mobile device 101 relative to the object 105 to be captured in an image (e.g., caused by user holding the mobile device 101 adjacent the paper 102), the captured image often suffers from perspective distortion. This result is often the case, even if the paper 102 is sufficiently flat, because it is difficult for the user to hold the mobile device 101 with the camera perfectly parallel to the paper 102. Any out of plane rotation of the device may result in perspective distortion in the captured image.

The mobile device 101 may execute a computer-implemented process which includes planar projections recovery program code 110 to correct for perspective distortion in the captured image, e.g., before being able to recover embedded data from the captured image. In an example, the program code may be executed to estimate parameters of a planar projection matrix (or homography) that relates the image captured by the mobile device 101, to a coordinate frame of the original object 105, and thus recover a transform of the captured image. The recovered transform can then be input to reconstruct and output a rectified image that is free from perspective distortion (e.g., properly orientated), while maintaining the correct scale (e.g., aspect ratio) of the captured image. Having a rectified image simplifies the task of recovering data that may be represented by the captured image.

The system 100 may include a machine-readable storage medium and a processor (e.g., on the mobile device 101) capable of storing and executing the program code 110 to implement the computer-implemented process described herein. The processor may be a central processing unit (CPU), a semiconductor-based microprocessor, or any other device suitable for retrieval and execution of instructions. As an alternative or in addition to fetching, decoding, and executing instructions, the processor may include one or more integrated circuits (ICs) or other electronic circuits that comprise a plurality of electronic components for performing the functionality described below. The functionality may be performed by multiple processors.

The processor may communicate with the machine-readable storage medium. The machine-readable storage medium may be any suitable machine readable medium, such as an electronic, magnetic, optical, or other physical storage device that stores executable instructions or other data (e.g., a hard disk drive, random access memory, flash memory, etc.). The machine-readable storage medium may be, for example, a computer readable non-transitory medium configured to store the program code 110.

Figure 2:
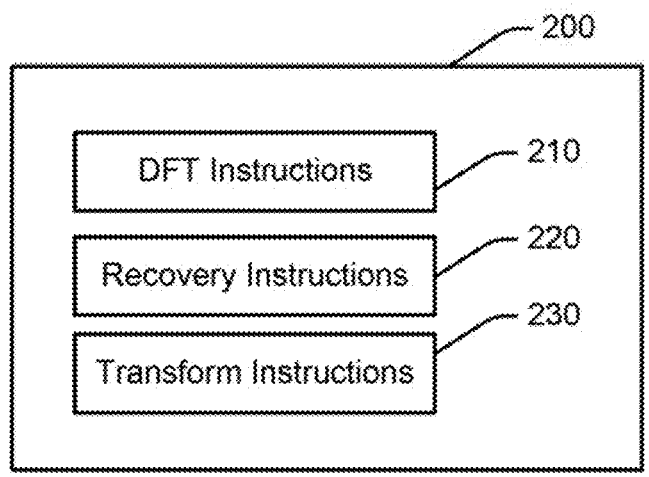
FIG. 2 shows an example architecture of machine readable instructions, which may be executed to recover planar projections and correct perspective distortion in a captured image.

Instructions of the program code 110 which implement the computer-implemented process of the system can be better understood with reference to FIG. 2 and the following discussion of various example functions of the program code 110.

FIG. 2 shows an example architecture of machine readable instructions, which may be executed to recover planar projections and correct perspective distortion in a captured image. In an example, the program code 110 discussed above with reference to FIG. 1 may be implemented as machine-readable instructions 200 (such as but not limited to, software or firmware). It is noted, however, that the architecture shown in FIG. 2 is provided only for purposes of illustration of an example operating environment, and is not intended to limit implementation of the program code.

During operation, the processor executes the function of the machine readable instructions 200 as self-contained modules to perform the computer-implemented process. These modules can be integrated within a self-standing tool, or may be implemented as agents that run on top of an existing application. In an example, the architecture of machine readable instructions may include Discrete Fourier Transform (DFT) peak point determination instructions (or "DFT instructions") 210, quasi-periodic two-dimensional object recovery instructions (or "recovery instructions") 220, and transform instructions 230.

DFT instructions 210 may include instructions to determine peak points of a DFT of an image, such as an image captured by a camera with frequency values associated with peaks compared to surrounding areas. A peak point may be relative to a particular area. For example, there may be two peak points identified where one of the peak points has a greater value than the other. In one implementation, the half plane of the DFT is analyzed for peak points, and peak points in corresponding frequency ranges on a second half plane are assumed based on peak points within the analyzed half plane.

DFT instructions 210 may also include instructions to identify a quasi-periodic two-dimensional object within the image based on the number, value, and/or position of the determined peak points. For example, the processor may determine if there are two peak points in the half plane to further analyze the relative position of the peak points.

Recovery instructions 220 may include selecting a set of displaced target locations in the target image. In an example, the DFT is performed over a region (e.g., of size N×N), and then the affine approximation is valid for that region. This may be repeated for several regions, centered at the respective target locations, each of which contributes a slightly different affine transform. It is from the differences in these transforms calculated from the local DFT that the vanishing points and thus the homography are computed. The region over which the DFT is computed can be varied and then the recovered affine is valid for that region.

Transform instructions 230 may include instructions to output information about the detection, such as to transmit, store, or display information about the orientation of the quasi-periodic two-dimensional object. In an example, the processor may be executed to rectify the image to remove the perspective distortion.

In an example, the machine-readable storage medium may include additional instructions, such as instructions to determine characteristics of the image of the quasi-periodic two dimensional object, if the presence of a quasi-periodic two dimensional object is indicated. For example, the processor may determine the object scale, camera distance, camera focus, object orientation, or other information. In an example, the processor may determine characteristics of the quasi-periodic object based on the DFT.

It is noted that additional properties of the captured image may also be analyzed, in addition to the DFT, to determine further characteristics of the captured image. In an example, the captured image is analyzed to determine if sufficient information is provided by the quasi-periodic two-dimensional object for the underlying or embedded data associated with the object to be analyzed. For example, if the quality of the image is below a threshold, the processor may determine not to analyze the quasi-periodic, two-dimensional object to decode it. Information may be displayed or otherwise provided to the user related to the presence of the object and the quality of the capture. The user may then recapture an image for the processor to analyze to determine if the image of the recaptured image is of sufficient quality.

Before continuing, it should be noted that the system described above is provided for purpose of illustration, and is not intended to be limiting. Other devices and/or device configurations, as well as program code architecture(s) may be utilized to carry out the operations described herein.

The computer-implemented process may be better understood with reference to the following example functions. If the four corners of a rectangular printed image of known aspect ratio can be accurately distinguished, then it is possible to compute the planar homography that relates the captured image to the original print (e.g., by solving a linear system of equations with eight unknowns). In practice, however, the aspect ratio of the image may be unknown, the corners may not be preserved in the halftone rendering process (as the corners may lie in a highlight region of the image, and hence halftone dots may not extend to the corners), and/or the extent of the physical print may extend beyond the limits of the captured image.

Regardless of such deficiencies in the captured image, the periodic nature of the halftone pattern can be represented in the Fourier domain, and affine approximations to the local transform can be computed at different points in the captured halftone image. From a subtle combination of these affine approximations, the remaining parameters of the homography can be recovered.

To remove the projective distortion from the perspective image of a plane, the projective transform or homography that relates the rectified image coordinates to the distorted counterparts may be recovered. In homogeneous coordinates, this transform can be represented as a 3×3 matrix, H, as follows:

$$\begin{pmatrix} x' \\ y' \\ w' \end{pmatrix} = \begin{bmatrix} h_{11} & h_{12} & h_{13} \\ h_{21} & h_{22} & h_{23} \\ h_{31} & h_{32} & h_{33} \end{bmatrix} \begin{pmatrix} x \\ y \\ w \end{pmatrix} = \begin{bmatrix} A & t \\ v^T & 1 \end{bmatrix} \begin{pmatrix} x \\ y \\ w \end{pmatrix}$$

Or simply as x'=Hx, where finally the transformed image locations are given by x"=x'/w' and y"=y'/w'. Note that the planar homography is the most general form of this transformation, and that the homography can be represented as being composed from affine A (2×2) and translation (t) when the elements of v are zero.

For purposes of illustration, consider data-bearing images that have an array of symbols (usually simple dots) on a two-dimensional periodic structure. Data may be embedded by means of perturbations on elements in the periodic structure. In the case of Stegatones the periodic structure depicts an image, and the symbols are the halftone dots. For other applications (e.g., grid codes) there is no image depicted by the structure.

In the case of Stegatones the image input to construct the halftone pattern may be known at decode time, or advantageously for some applications, the data may be embedded in an unknown image (this is called a mule-less Stegatone). The two-dimensional structure may be a fixed size small enough to always fit inside the field of view of the camera or may extend over a larger region with a repeating code that can be recovered from a capture-window-sized region of interest.

Figure 3A:
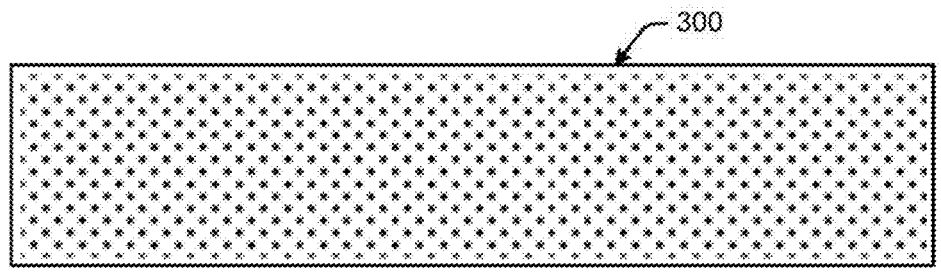
FIG. 3a shows an example of a halftone screen.
Figure 3B:
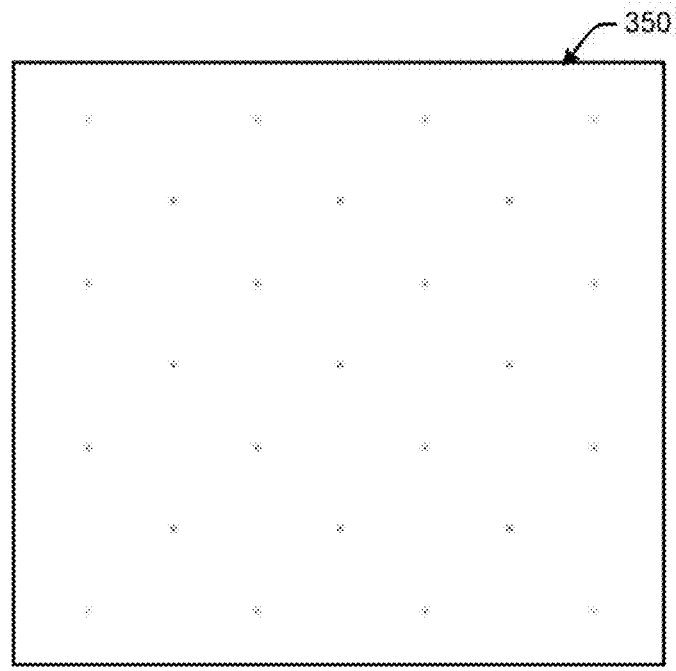

FIG. 3a shows an example of a halftone screen 300. FIG. 3b is a magnitude plot 350 of an example Fourier transform (shown as an inverted log plot to illustrate weaker higher frequency components) of the halftone screen shown in FIG. 3a. For purposes of illustration, consider a monochrome 45 degree clustered-dot halftone screen with a cell period of 150 cells per inch (when printed at 600 dots per inch; dpi) in each of the horizontal and vertical directions (referred to as a 106.1 line per inch (or "lpi")) screen as the spacing is measured in the 45 degree screen direction. An example of the regular structure of this screen 300 is shown in FIG. 3a for a 12.5% uniform grey level (e.g. value 224 out of a range 0 to 255).

Screen 300 is an example of a monochrome clustered-dot halftoning screen, and is the same structure used on data-bearing halftones, or Stegatones. While described for purposes of illustration, it is noted that the techniques described herein are applicable to other screens.

FIG. 3b shows the magnitude plot 350 of the example Fourier transform (shown as an inverted log plot to illustrate weaker higher frequency components) of the 45 degree halftone screen 300 shown in FIG. 3a. Computing the discrete Fourier Transform (DFT) of a patch of the example 12.5% grey halftone pattern shown in FIG. 3a, and examining its magnitude (as shown in the plot 350 in FIG. 3b), reveals that the fundamental frequencies of the halftone pattern along the 45 degree directions are strongly visible as a set of 4 peaks surrounding the DC (at the center of the DFT). Also evident are a number harmonics repeated toward the boundary of the baseband. This structure of the DFT is strongly preserved when the halftone depicts image content, even where the structure of the halftone has been "disturbed," e.g., to create a Stegatone.

Figure 4A:
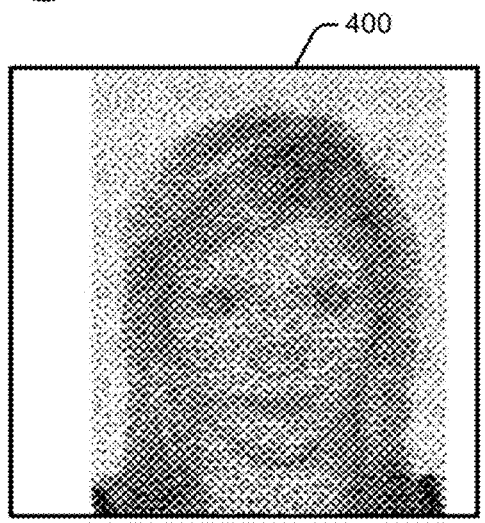
FIGS. 4a-b show (a) an example of a digital bitmap image of a Stegatone, and (b) example of a corresponding magnitude plot of the Fourier transform of the image in FIG. 4a highlighting fundamentals as dots
Figure 4B:
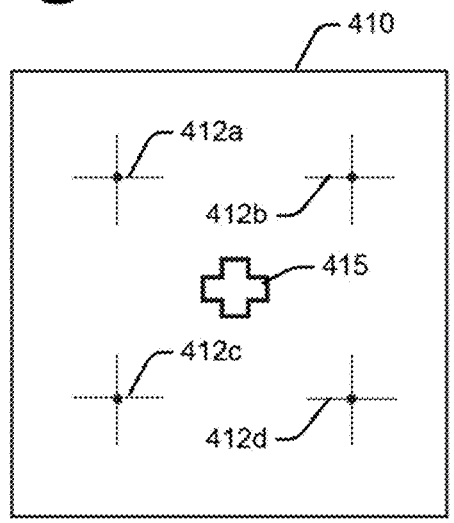
Figure 4C:
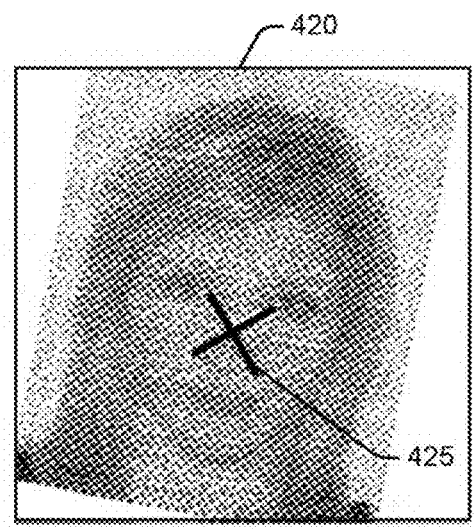
FIGS. 4c-d show (c) an example region of a target image of the digital bitmap image in FIG. 4a captured with perspective distortion, and (d) example of a corresponding magnitude plot of the Fourier Transform of the image in FIG. 4c highlighting fundamentals as dots.
Figure 4D:
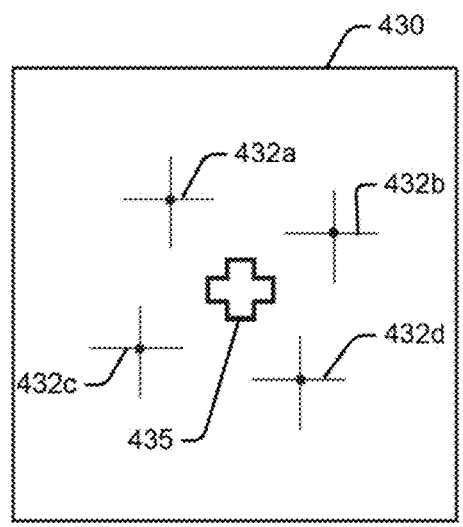

FIGS. 4a-b show (a) an example digital bitmap 400 of a Stegatone (e.g., 400×400 pixels square), and (b) corresponding example magnitude plot 410 of the Fourier transform highlighting fundamentals 412a-d using dots. Each cell in the original digital halftone is 4×4 pixels, with many of the cells shifted to represent information. FIGS. 4c-d show (c) an example region of an image 420 captured using a 2 mega pixel camera (e.g., 600×600 pixels square), and (d) an example of corresponding magnitude plot 430 of the Fourier Transform highlighting fundamentals 432a-d using dots.

With reference to the example shown in FIGS. 4a and 4c, Stegatones are clustered-dot halftone images where data is embedded in individual dot dusters by means of small shifts of those dot dusters, which are logically contained in cells. It should be noted that while described as applied to Stegatone images, the techniques described herein are applicable to other examples. In an example, the technique is applied to images to be analyzed for recognition tasks. The technique may also be applied to enhanced images for easier interpretation.

In the example shown in FIGS. 4b and 4d, the amplitude of the discrete Fourier transform (DFT) applied to the captured image 420 exhibits strong spikes (412a-d and 432a-d) that correspond to the underlying periodic structure. These spikes are a result of the perturbations being considerably smaller than the period.

A halftone threshold array for Stegatones is the 45-degree screen. The generated output includes dot patterns that are arranged in a checkerboard pattern. If such a halftone is captured with no distortion, the fundamental frequency spikes are arranged in a rectangle (actually a square) with side perpendicular to the spatial frequency axes, and the DC term in its center, as shown in FIG. 4b.

In practice, however, the captured Stegatone may be distorted due to the inaccuracies of holding a mobile capture device by hand. Again, FIG. 1 shows an example of a mobile camera capturing a printed Stegatone. The effect can be seen by comparing the example plot 410 in FIG. 4b (of the original digital bitmap shown in FIG. 4a), with the example plot 430 in FIG. 4d (of the captured image shown in FIG. 4c).

In an example, the computer-implemented process may identify the presence of spikes 432a-d in the captured image as part of recovering a rectified image (e.g., corresponding to digital bitmap 400) from captured image 420. These spikes 432a-d in the captured image 420 indicate the presence of the mark, and indicate an estimated affine transform that approximates the projection.

To illustrate, the spikes 432a-d may be easier to identify in the plot 430 by disregarding a region near the DC (sum) term that dominates the DFT. For example, a mask 415, 435 may be applied to the plot. The DC term represents the average of the entire image, and the values next to it represent the largest scale features of the image. Therefore, care should be used to mask the DC region. The mask 415, 435 should not be too small, as this may allow leakage of large DC-related values. The mask 415, 435 should not be too large, as this may hide the sought after fundamental frequencies.

In this example the computer-implemented process includes blocking the DC area with a "plus-sign" shaped mask. However, other shapes (e.g., a disk-shaped mask) can also serve this purpose. After masking, the largest remaining values are the four spikes 412a-d and 432a-d that correspond to the halftone screen in the Stegatone. In the example shown in FIG. 4b, these spikes 412a-d form a perfect square. In the example shown in FIG. 4d, these spikes 432a-d are affine distorted due to the distortion of the captured image. In other examples, the mask may act more like a filter, composed of values that attenuate the frequency components by an amount directly proportional to their distance to the DC.

The affine transforms in the spatial and frequency domains are related. Therefore, the affine approximation to the image transform can be recovered directly from the relocation of the fundamental peaks in the captured image relative to their original expected locations. For illustrative purposes, the recovered affine transform is used to transform the 45 degree screen directions 425 at the center of the Stegatone.

The computer-implemented process may then recover the affine components of the transform from the relative displacement of the fundamentals. An affine transform measured in the DFT is related to that in the image space as:

$$A_I = (A_{FT}^{-1})^T$$

In the above equation, $A_I$ and $A_{FT}$ are the 2×2 affine transforms in the image and Fourier domains, respectively. $A_{FT}$ can be solved by identifying the corresponding locations of a pair of fundamentals between the target image (FIG. 4a) and captured image (FIG. 4c).

The magnitude of the Fourier Transform is symmetric with respect to the location of the DC, and thus appropriate pairs of fundamentals describe all four locations, the estimation of which is referred to herein as the AffineDFT method. In addition, in those cases where the actual transform includes planar perspective components, the AffineDFT method provides a reasonable approximation to the local planar homography at the center of the region covered by the DFT, as follows:

$$x' = \begin{pmatrix} x' \\ y' \\ w' \end{pmatrix} = \begin{bmatrix} A_I & 0 \\ 0 & 1 \end{bmatrix} \begin{pmatrix} x \\ y \\ w \end{pmatrix} = H_A x$$

To recover the parameters of the projective transform, the vanishing points of the 45 degree screen directions can be found in the captured image 420. This step can be accomplished by the computer-implemented process, directly in the image, by applying grouping operations to fit lines to individual rows of the 45 degree screen cells corresponding to the diagonals of the underlying checkerboard. In an example, the affine approximation can be used by applying the DFT to different regions of the captured image and for each one, approximating the local screen directions. As discussed above, this approach is based on an N×N region around each location used for the DFT to obtain the average affine transform for that point over a given region size.

FIGS. 5a-b illustrate an example of "imaginary" North, East, West, and South cardinal points (N, E, W, S) displaced a distance M from an origin O, showing (a) example positions of the cardinal points in the coordinate space of the original digital halftone 500, and (b) example corresponding positions of the cardinal points in the captured perspective image 550. In each case, the diagonals that connect the cardinal points correspond to the screen directions of the halftone pattern. In the case of planar perspective projection 550 when extended these screen directions meet at vanishing points VP1 and VP2.

Figure 6B:
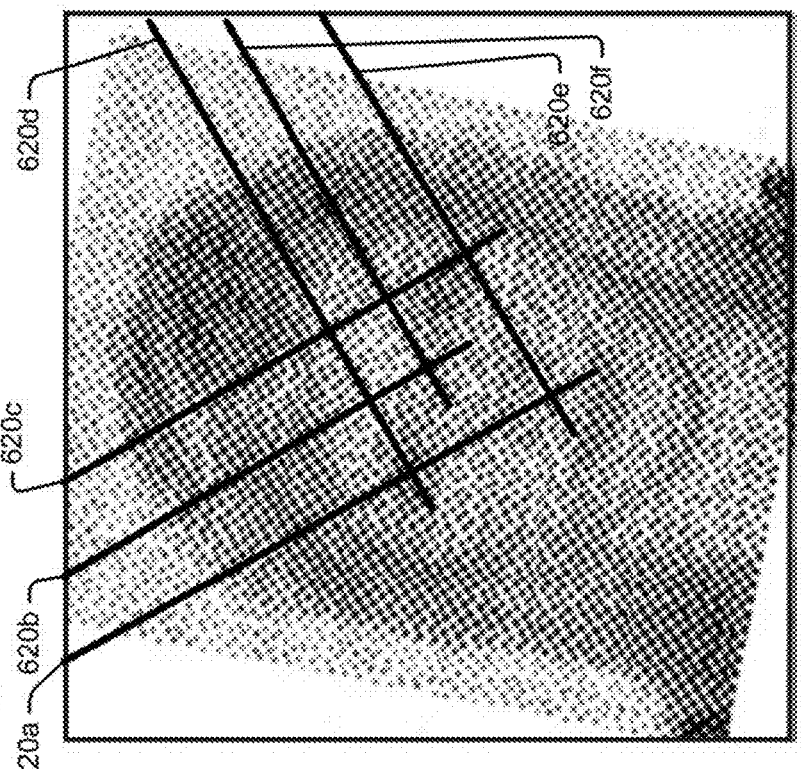
Figure 6A:
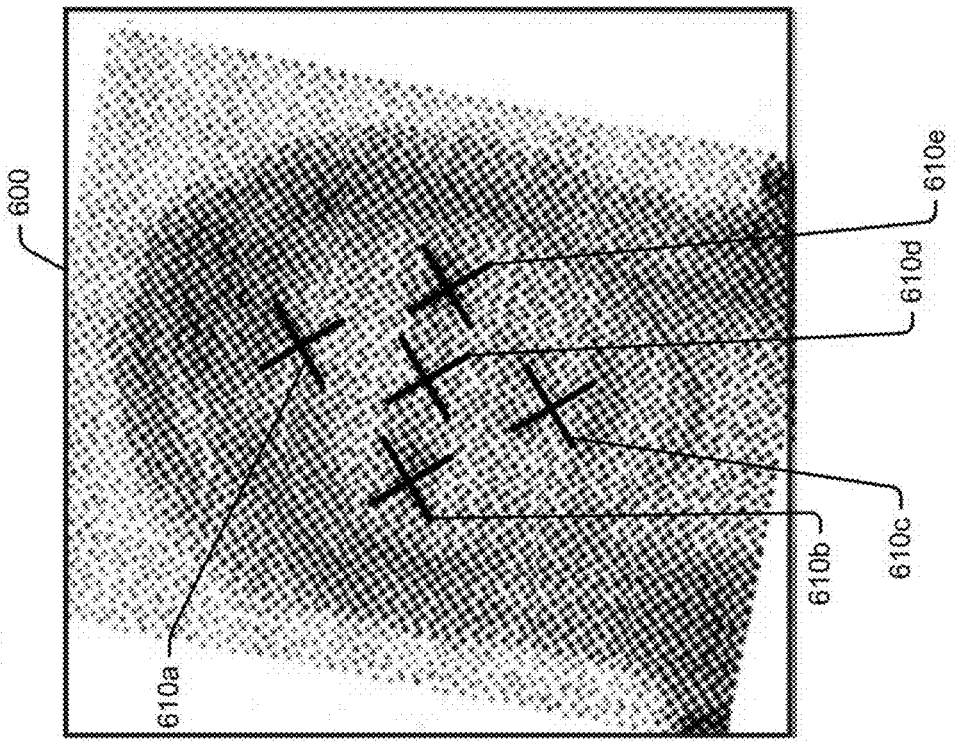

With the vanishing points, the computer-implemented process can recover the planar projection up to a final correcting affine transform. Consider for example the situation shown in FIGS. 6a-b. FIGS. 6a-b show (a) an example of transformed cardinal points 610a-e and recovered screen directions in a captured image 600, and (b) an example of vanishing lines 620a-f for the points 610a-e shown in FIG. 6a. In an example, affine approximations are sought using the DFT method (e.g., N=256) at the five locations on the captured image 610a-e. This output may be further processed to transform 45 degree screen directions at each location, as illustrated by FIG. 6a. The computer-implemented process may then recover two vanishing points corresponding to the 45 degree directions, e.g., by intersecting the two sets of five screen directions, as illustrated in FIG. 6b.

The computer-implemented process can then extend the projected diagonals 620a-f to meet at vanishing points VP1 and VP2 (e.g., as illustrated in FIG. 5b). Lines parallel to one screen direction converge on VP1, and lines parallel to the other converge on VP2. Conversely, based on the vanishing points (VP1 and VP2), and selecting the two points 610a and 610c as approximations for N' and S', the intersecting lines 620a, 620c, 620d and 620e from the vanishing points produce new estimates for E' and W' where the quadrilateral N'E'S'W' is guaranteed to be the projection of a rectangle in the original halftone space the sides of which are parallel to the screen directions (e.g., as illustrated in FIG. 5b). The closer the approximation of N' and S' to their true locations, the closer the rectangle will be to the original square defined by cardinal points in the original halftone coordinate space. In any case, the planar projection that relates the four points NESW (see FIG. 5a) and N'E'S'W' (see FIG. 5b) is correct up to an unknown scale and aspect ratio (e.g., to map the unknown rectangle to the known square).

In an example, positions of the cardinal points in the captured image can be expressed by the computer-implemented process as follows:

N'=HN; E'=HE; W'=HW; S'=HS

The homography relating the NEWS and N'E'W'S' quadrilaterals can be solved by the computer-implemented process using a linear method. For example, an 8×9 matrix A is formed, where each matched pair of points X and X' contributed two rows as follows:

$$\begin{pmatrix} 0 & 0 & 0 & -x_1x_3' & -x_2x_3' & -x_3x_3' & x_1x_2' & x_2x_2' & x_2x_2' \\ x_1x_3' & x_2x_3' & x_3x_3' & 0 & 0 & 0 & -x_1x_1' & -x_2x_1' & -x_3x_1' \end{pmatrix}$$

$$\begin{pmatrix} h_1 \\ h_2 \\ h_3 \\ h_4 \\ h_5 \\ h_6 \\ h_7 \\ h_8 \\ h_9 \end{pmatrix} = \begin{pmatrix} 0 \\ 0 \\ 0 \\ 0 \\ 0 \\ 0 \\ 0 \\ 0 \\ 0 \end{pmatrix}$$

In the expression above, the length-9 vector h is formed from the elements of $H_v$ in row order. The solution of the vector h up to an unknown scale corresponds to the null space of A, and can be found by the computer-implemented process by single value decomposition ($A=UDV^T$, where D is a diagonal matrix of singular values). Then vector h corresponds to the column of V with the smallest singular value in D. The final scale and aspect ratio can be recovered by the computer-implemented process by applying the AffineDFT method to a reconstructed image based on $H_v$ to reveal a correcting affine transform $A_c$ as follows:

$$H_c = \begin{bmatrix} A_c & 0 \\ 0 & 1 \end{bmatrix} H_v$$

Figure 7B:
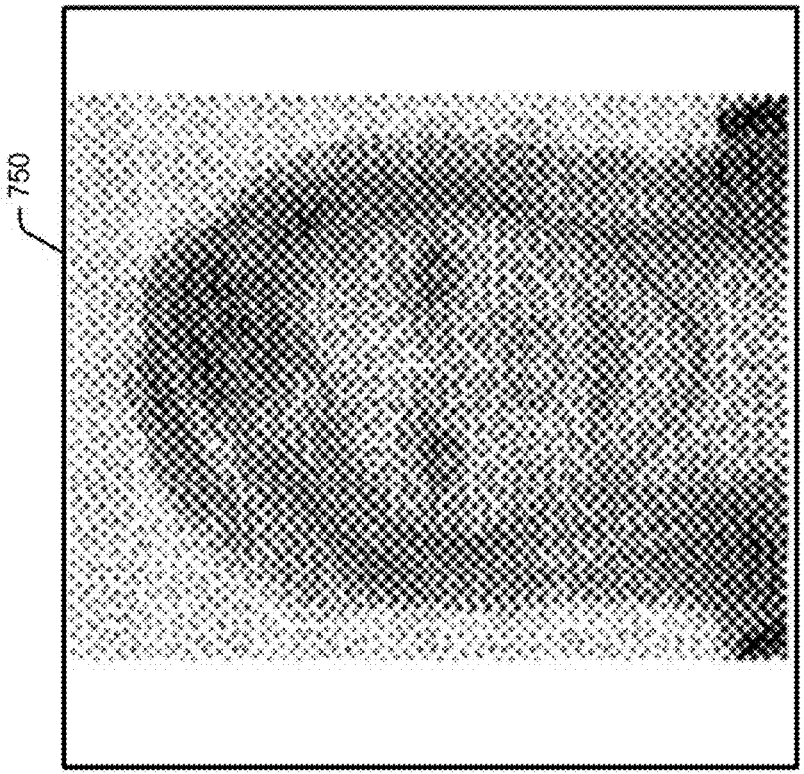
Figure 7A:
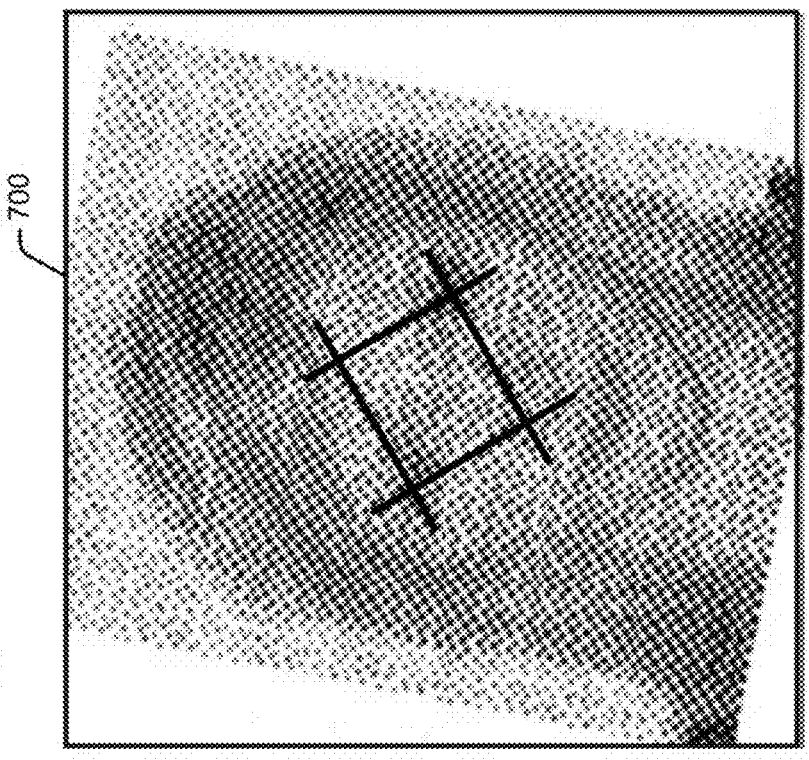

Accordingly, starting with the affine approximation computed above (to define initial estimates for N' and S') a good 3×3 planar projection can be recovered, as illustrated in FIGS. 7a-b.

FIGS. 7a-b show (a) an example image 700 showing reconstructed East and West cardinal points using approximate North and South cardinal points plus calculated vanishing points, and (b) an example rectified image 750 obtained using a homography calculated from the transformed cardinal points shown in FIG. 7a. In this example, North and South cardinal points are transformed by the computer-implemented process into the captured image using the initial affine approximation to the transform, $H_A$, as computed above. The vanishing points are then used to "hallucinate" East and West cardinal points though their intersection with the North and South points. The homography is then computed by the computer-implemented process from these four points.

This technique enables the computer-implemented process to reconstruct the original image from the captured image having perspective distortion. The scale and location of the cardinal points in the rectified image 750 are close or equal to the values in the original digital halftone coordinate space. These points are imaginary (e.g., defined with respect to the digital halftone). In addition, computer-implemented process can process the reconstructed image to recover data and/or further rectified, e.g., by additional application of the affine approximation.

In an example, the overall approach of the computer-implemented process, as described above with reference to FIGS. 6a-b and 7a-b is as follows:

1. Use the AffineDFT method to estimate an initial central affine $A_I$.
2. Use $A_I$ to transform the cardinal points to N'E'W'S'.
3. At each transformed cardinal point, apply the AffineDFT method to recover the local screen direction vectors.
4. Approximate two vanishing points VP1 and VP2 from the sets of orthogonal screen directions.
5. Update E' and W' by intersecting lines from VP1 and VP2 through the original N' and S'.
6. Calculate the homography $H_v$ from the new positions of the four cardinal points.
7. Rectify the original image using $H_v$.
8. Apply the AffineDFT method to recover $A_c$ and, in turn, the final corrected homography $H_c$.

It is noted that during execution of the program code, the above operations (and/or various portions thereof) can be iterated to successively improve the approximation of local screen directions, and improve increasingly small perspective distortions. Example implementation of this approach is illustrated by the flowcharts in FIGS. 8 and 9.

Figure 9:
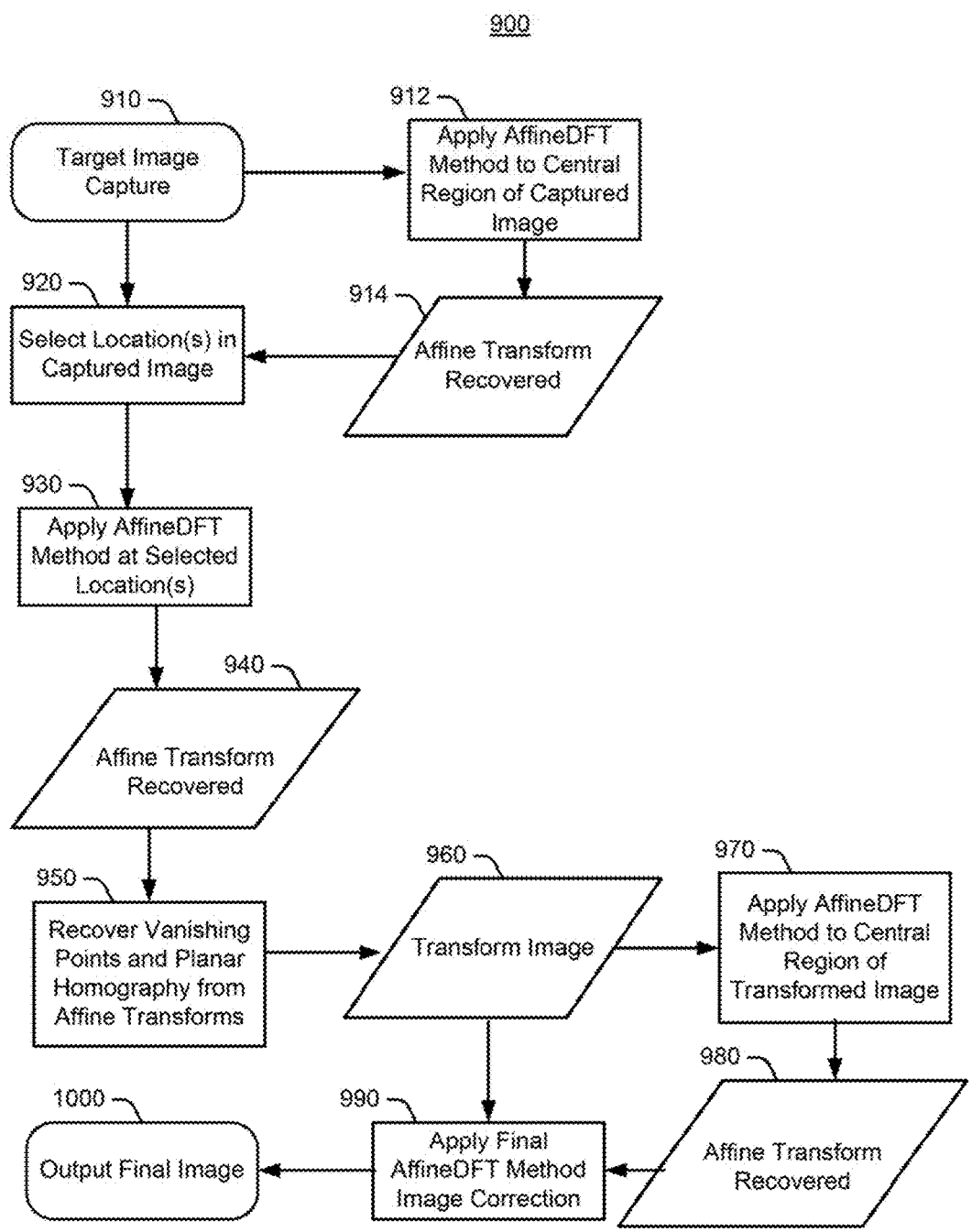

FIGS. 8 and 9 are flowcharts illustrating example operations which may be implemented to recover planar projections and correct perspective distortion in the image. The operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In FIG. 8, operations 800 illustrate a method of recovering a planar projection in a captured image. Operation 810 includes selecting displaced points (e.g., set(s) of points) in the captured image. Operation 820 includes, recovering an affine transform of a quasi-periodic object based on peak locations of Discrete Fourier Transform (DFT) of the target image (e.g., for each set of displaced points).

Operation 830 includes combining each affine transform (e.g., for the sets of displaced points) to recover a planar projection and correct for perspective distortion in the captured image. In an example, the DFT is performed over a region (e.g., of size N×N), and then the affine approximation is valid for that region. This calculation may be repeated for several regions, each of which contributes a slightly different affine transform. It is from the differences in these transforms calculated from the local DFT that the vanishing points and thus the homography are computed. The region over which the DFT is computed can be varied and then the recovered affine is valid for that region.

The operations shown and described herein are provided to illustrate example implementations. It is noted that the operations are not limited to the ordering shown. Still other operations may also be implemented.

Further operations 900 are illustrated by way of example in FIG. 9. In operation 910, a target image is captured (e.g., using a mobile device). In an example, the AffineDFT method is applied to a central region of the target image in operation 912, and an affine transform is recovered at 914.

In operation 920, location(s) (x, y) are selected in the captured image, and in operation 930, the AffineDFT method is applied to the selected location(s), and the affine transform is recovered at 940. In operation 950, vanishing points and planar homography are recovered from the affine transforms, and the image is transformed at 960. The AffineDFT method may be applied to a central region of the image in operation 970, and the affine transform is recovered at 980.

In operation 990, the final affine image correction is applied to output the final image 1000.

The systems and methods described herein have been shown to provide good approximations to known or otherwise estimated projective transforms for large number of simulated and real image data. The following Example shows the results using the systems and methods described herein to recover planar projections from a captured image having perspective distortion, as compared to a known accurate image registration technique.

EXAMPLE

In this example, simulated data was used to test the technique described herein across a wide range of image types and system parameters.

To explore the wide parameter space, a large number of simulated 2K×2K digital halftones were constructed, and related Stegatones were derived from these halftones with random payloads. Nearly 500 images were used from the McGill calibrated color image database (e.g., including animals, landscapes, and man-made subsections). From each of the 786×576 RGB color TIFF images, the central 500× 500 region of the green channel was extracted, and scaled to 2000×2000 pixels to generate halftone and random payload Stegatone images with 4×4 pixel blocks defining each halftone cell.

Distorted test images were generated by selecting a halftone or Stegatone at random from the pool of images, and warping it using a random planar homography. The homography is defined by randomly displacing the four corners of the image over a range [−R, +R] according to a uniform random distribution in each of the x and y directions. The homography was estimated according to the techniques described above, with no knowledge of the pattern other than that it was derived from a 45 degree halftone with a cell size of 4×4 pixels, and compared directly against the randomly generated homography used to warp the original halftone. The transforms are not identical. Instead, the extent to which these transforms match was measured, and the relative locations of the image was estimated (e.g., the center of the distorted test image) back to the original rectified haltone geometry.

To compare the two (inverse) homographies H' and H'', the following relative error measurement was used. Consider two points, C and R=C+D, where C is the center of the distorted halftone image, and R is a relative displacement D from the center C. The respective transformed image locations can be expressed as:

$$C'=H'C;\ R'=H'R;\ C''=H''C;\ R''=H''R$$

From these expressions, the relative displacements after transformation can be expressed as:

$$D'=R'-C';\ D''=R''-C''$$

The relative error is given by D''-D' and can be expressed as a relative percentage error.

$$E_\% = \frac{100 * \|D'' - D'\|}{\min(\|D'\|, \|D''\|)}$$

For a tested image, the final reported accuracy of the homography is obtained by computing the value E % at the four corners of a 200×200 pixel square centered on C, and taking the maximum. Typical results for a DFT of size 512×512 and a spacing of cardinal points (M) of 512 pixels indicate for all values of the distortion parameter (R), the median error reduces to about 0.13% after ten iterations, asymptotically approaching a limit governed by the number of samples in the DFT and the resolution of the image. For comparison, a similar experiment using the existing image based registration method has a median percentage error rate of 0.08%.

Table 1 presents the results of two parameters found according to the techniques described above: 1) various sizes, N, of the DFT (rows), and 2) the spacing (M) (columns) for a fixed distortion R=400 pixels. For each parameter combination, the media percentage error (E %) is shown after 10 iterations.

TABLE 1

| | Median Percentage Error Over 100 Tests | | | |
|---|---|---|---|---|
| E % | 64 | 128 | 256 | 512 |
| 128 | 0.96 | 0.68 | 0.53 | 0.59 |
| 256 | 0.47 | 0.37 | 0.26 | 0.25 |
| 512 | 0.29 | 0.25 | 0.19 | 0.13 |

It can be seen from the results in Table 1 that as the size of the DFT, and the spacing of the cardinal points increase from 128/64 to 512 pixels, the accuracy improves significantly. It is noted that all results are for Stegatone data; but the results for un-modified halftones were found to be similar.

It is noted that the examples shown and described are provided for purposes of illustration and are not intended to be limiting. Still other examples are also contemplated.

The invention claimed is:

1. A method of recovering a planar projection in a captured image, comprising:
   selecting displaced points in the captured image;
   recovering an affine transform of a quasi-periodic object for each of the displaced points based on peak locations of Discrete Fourier Transform (DFT) of the captured image; and
   combining each of the affine transforms for the displaced points to recover the planar projection and correct for perspective distortion in the captured image.

2. The method of claim 1, wherein the quasi-periodic object is a two-dimensional object with embedded data.

3. The method of claim 1, wherein recovering the affine transform is based on peak locations of the DFT of a local region in the captured image.

4. The method of claim 1, wherein recovering the affine transform is at a set of locations apart from an origin in an image space of the captured image.

5. The method of claim 1, further comprising approximating pairs of perpendicular directions based on the affine transforms.

6. The method of claim 5, further comprising identifying vanishing points for the pairs of perpendicular directions.

7. The method of claim 6, further comprising recovering a planar homography based on the vanishing points.

8. The method of claim 7, further comprising applying a final affine correction based on a reconstructed image after at least one iteration.

9. The method of claim 1, wherein further comprising recovering vanishing points and a planar homography based on an iterative process.

10. The method of claim 1, further comprising determining where the displaced points are located in the captured image based on an initial affine approximation, the displaced points being dependent on fixed locations in a reference image space with a defined halftone geometry.

11. A machine-readable non-transitory storage medium comprising instructions executable by a processor to:
recover a plurality of affine transforms of a quasi-periodic object for a displaced point in a captured image, the affine transforms based on a peak location of Discrete Fourier Transform (DFT) of the captured image;
combine the affine transforms; and
recover a planar projection correcting for perspective distortion in the captured image.

12. The machine-readable non-transitory storage medium of claim 11, wherein the instructions are further executable by the processor to recover vanishing points and planar homography based on an iterative process.

13. The machine-readable non-transitory storage medium of claim 11, wherein the instructions are further executable by the processor to:
transform the captured image,
apply a final affine image correction to the transformed image, and
output a final rectified image.

14. A system having a processor to recover a planar projection in a captured image, the processor executable to:
for each set of displaced points in the captured image, recover an approximate affine transform of a quasi-periodic object based on peak locations of Discrete Fourier Transform (DFT) of the target image; and
combine each approximate affine transform for the sets of displaced points to recover the planar projection to correct for perspective distortion in the captured image.

15. The system of claim 14, wherein the processor is further executable to:
apply the DFT at each of a plurality of selected locations in the captured image, and
output a rectified image.

* * * * *

UNITED STATES PATENT AND TRADEMARK OFFICE
CERTIFICATE OF CORRECTION

| | | |
|---|---|---|
| PATENT NO. | : 10,002,413 B2 | Page 1 of 1 |
| APPLICATION NO. | : 15/327977 | |
| DATED | : June 19, 2018 | |
| INVENTOR(S) | : Stephen Pollard et al. | |

It is certified that error appears in the above-identified patent and that said Letters Patent is hereby corrected as shown below:

In the Drawings

In sheet 8 of 9, FIG. 8, reference numeral 830, Line 1, delete "Combin" and insert -- Combine --, therefor.

Signed and Sealed this
Twenty-second Day of January, 2019

Andrei Iancu
*Director of the United States Patent and Trademark Office*